Sept. 18, 1951 W. J. SCHIESER ET AL 2,568,255
ELECTRONIC CHECK-WEIGHING AND SEGREGATING APPARATUS
Filed July 24, 1948 3 Sheets-Sheet 2

Inventors
Warren J. Schieser
John F. Kelley
By
W. S. McDowell
Attorney

Patented Sept. 18, 1951

2,568,255

UNITED STATES PATENT OFFICE 2,568,255

ELECTRONIC CHECK-WEIGHING AND SEGREGATING APPARATUS

Warren J. Schieser and John F. Kelley, Columbus, Ohio, assignors to The Exact Weight Scale Company, Columbus, Ohio, a corporation of Ohio Application July 24, 1948, Serial No. 40,544

6 Claims. (Cl. 209—121)

1

This invention relates to apparatus for classifying or segregating articles according to their weight as the same advance along linear supporting means and without interruption in their sustained movement, the said supporting means being of the type including a commodity-receiving member of a weighing scale.

More specifically, the apparatus comprising the invention is adapted for sensitive and high speed check-weighing of various commodities through the use of a system in which such commodities continuously travel in single successive order longitudinally along a plurality of adjoining conveyor sections toward a diverting zone having one or more movable gates for directing the weighed commodities into different channels or paths of discharge. In this apparatus, at least one of the conveyor sections forms a component part of a weighing mechanism and over which the articles being handled are individually passed without interruption in their movement, whereby variations in weight of the articles applied to said weighing mechanism produce proportionate variation in a pivotally movable member of the weighing mechanism, electro-responsive means being provided in association with said member to effect automatically changes in position of the diverter gate or gates, so that articles of a desired or predetermined weight will be caused to follow a selected course of discharge from the apparatus, while articles or commodities possessing weights other than those of said desired weight will follow one or more different courses of discharge, thereby providing for the separation of under and over weight articles from those of desired weight.

Apparatus of the prior art for this purpose is objectionable from the standpoint that the same lacks sensitivity in responding to minute weight variations in the articles or commodities being checked and further in the inability of such apparatus in providing for the continuous high speed weight-checking operations in conformity with the needs of modern industries.

Among the objects of the invention, therefore, are to provide:

Automatic check-weighing and segregating apparatus in which continuous uninterrupted movement of the articles undergoing weighing is present; to provide apparatus of this character which is highly accurate and responsive to minute weight variations in the articles being handled in separating over or underweight articles from those of a desired or predetermined weight; to provide in such apparatus a weighing scale mechanism having a motor driven conveyor type receiver for the articles to be weighed thereon, the receiver being so constructed as to support its

2 conveyor and the motor means for driving the same; to provide an improved electro-responsive control actuated by the movable beam or lever of the weighing mechanism for controlling the operating positions of pivotally movable diverter gates employed in connection with the conveyor means for causing under and overweight articles to follow a different course of discharge from the apparatus than those of desired weight; to provide means which may be used in check-weighing operations under conditions in which the atmosphere surrounding the apparatus contains dust or small particles of matter which may be deposited on the exposed surfaces of the apparatus; and to provide apparatus of a simple, positive and reliable construction which may be used for prolonged periods of operation without requiring undue manual attention, adjustments or repair.

For a further understanding of the invention, including additional objects and advantages thereof, reference is to be had to the following description and the accompanying drawings, wherein.

Referring more particularly to the drawings, wherein has been illustrated a single exemplary embodiment of the present invention, the numeral 10 designates a housing or cabinet in which the apparatus is placed or supported. The apparatus includes a weighing scale S which, in this instance, has been shown as of the even-balance type which we prefer to use because of its recognized accuracy and sensibility, although it is within the province of the invention to utilize other conventional types of weighing devices.

Figure 1:
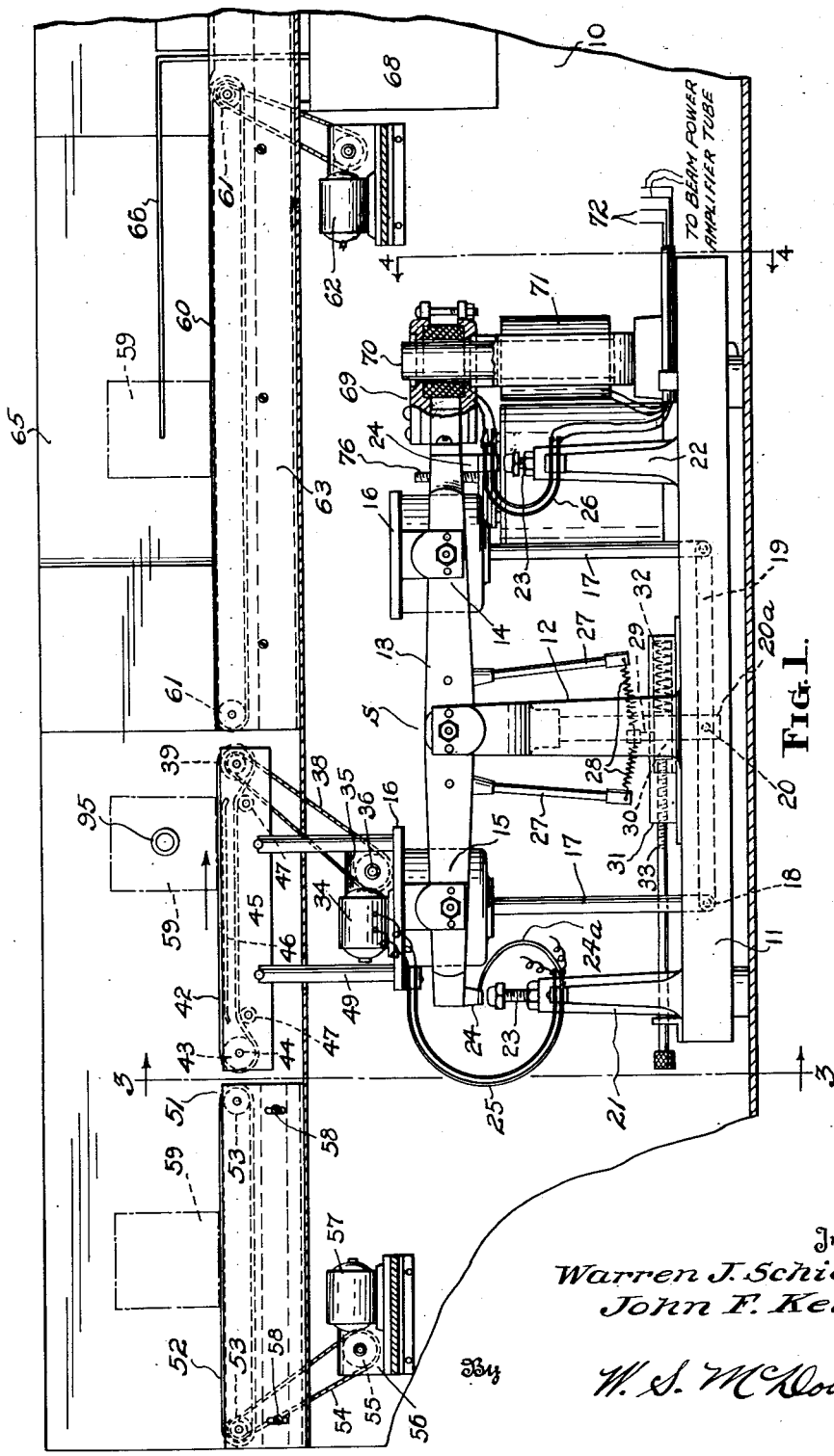
Fig. 1 is a vertical sectional view taken through the improved check-weighing apparatus formed in accordance with the present invention.

As illustrated, the scale embodies a base 11 from which arises stationary brackets 12 which effect, at their upper ends, trunnioned supports for a vertically oscillatory weighing beam or lever 13. Spaced equidistantly from its pivotal axis of turning movement on the brackets 12, the lever 13 carries pivotally mounted known weight and commodity receivers 14 and 15 respectively. These receivers include outrider platters 16 from which depend rigid stems 17, the lower ends of the latter being pivoted, as at 18, to a check rod 19 which, in turn, is centrally pivoted, as at 20, on a center bearing stem 20a which is rigidly connected with and depends from the brackets 12, the check rod being in vertical alignment with the supporting trunnions or pivots of the lever 13. The base is provided adjacent to its ends with upstanding brackets indicated at 21 and 22. These brackets carry at their upper ends threadedly adjustable studs 23, which cooperate with lugs 24 on or adjacent to the ends of the lever 13 for controlling the extent of oscillation of said lever. Movement of the lever from its normal position of balance until the same engages with one or the other of the studs 23 is resisted by the employment of a bow spring illustrated at 24a. This spring at its lower end is attached to the bracket 21 and at its upper end to one of the lugs 24 carried by the lever 13. In addition to the spring 24a, further adjustment and control over the swinging movement of the scale lever is obtained by providing said lever with a pair of rigid depending rods 27, the latter being arranged on opposite sides of the bracket 12, as indicated in Fig. 1. The lower ends of the rods 27 have connected therewith the outer ends of a pair of light coil springs 28, and the inner ends of these springs are attached to an upright post 29 carried by a sliding block 30 arranged in a housing 31 mounted on the base 11.

The block 30 is pressed in one direction by a spring 32 and the action of this spring is regulated by a screw threaded rod 33, the threaded portion of the latter being received in a threaded bore formed in the housing 31, the inner end of the rod engaging one end of the block 30. By turning the rod 33, the block may be moved longitudinally in the housing 31 against the resistance of the spring 32 or in the opposite direction by responding to the expansive force of said last-named spring. By this construction, the deflection of the beam or lever from its normal position and the forces required to effect such deflection may be readily controlled or regulated.

Joined with the respective outrider plates 16 and the upstanding brackets 21 and 22 and electrically insulated therefrom are pairs of light bow springs 25 and 26 which serve as electrical current conductors for mechanisms carried by the respective end portions of the lever 13, which mechanisms are hereinafter more fully described.

While we have described in considerable detail a weighing mechanism which has been found to be particularly effective for use in our improved check-weighing machine, it is desired to reiterate that such weighing mechanism is but one of several which may be employed and therefore we do not desire to be understood as confining the invention to an even-balance type weighing mechanism, as it will be obvious to those skilled in the art that various other standard types of weighing mechanisms or motions may be employed.

Mounted on the upper surface of the outrider platter of the commodity receiver 15 is an electric motor 34 which is furnished operating current by way of the bow springs 25, and which has associated therewith a speed-reducing gear housing 35 which includes a driven shaft 36. This shaft is equipped with a sprocket 37 around which passes an endless chain 38, the latter leading to a corresponding sprocket 39 provided on a cross shaft 40. This shaft also carries an elongated belt wheel 41 around which is trained the rear or discharge end of an endless conveyor belt 42. The upper run of this belt travels in the direction of the arrow indicated in Fig. 1 and the forward end of the belt 42 is passed around an elongated belt wheel 43 which is carried by a cross shaft 44 journaled in a conveyor frame 45 in the same manner as the shaft 40. The upper run of the belt 42 passes over a rigid guide plate 46, while the under run of the belt is supported by guide rolls 47. The conveyor frame is formed in this instance with laterally projecting studs 48 which are positioned in sockets provided in the upper ends of a plurality of posts 49 which are carried by the corner regions of the outrider platters 16 of the commodity receiver 15.

Figure 2:
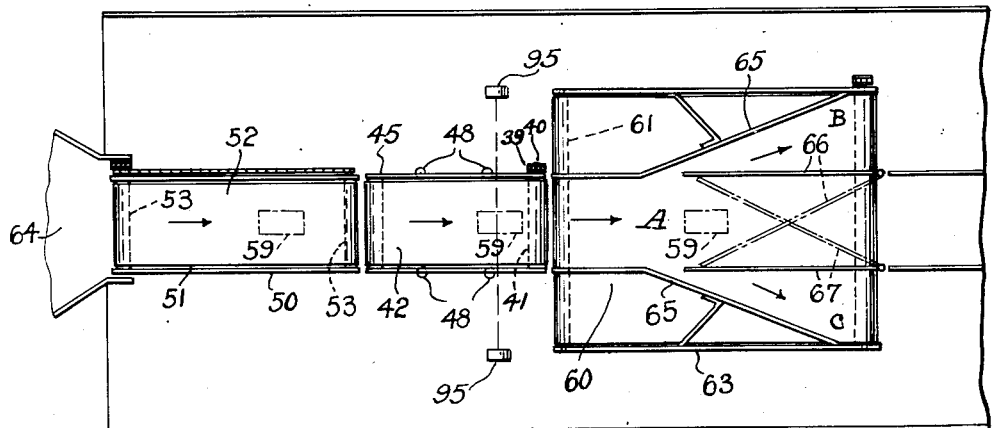
Fig. 2 is a top plan view thereof.
Figure 3:
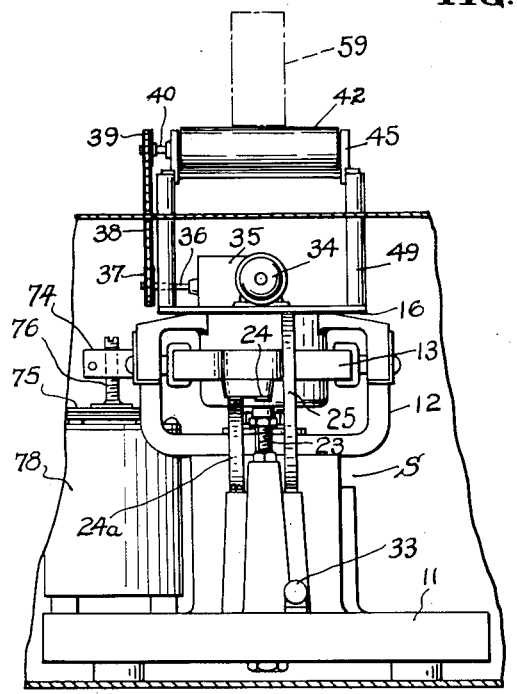
Fig. 3 is a vertical transverse sectional view of the apparatus taken on the line 3—3 of Fig. 1.
Figure 4:
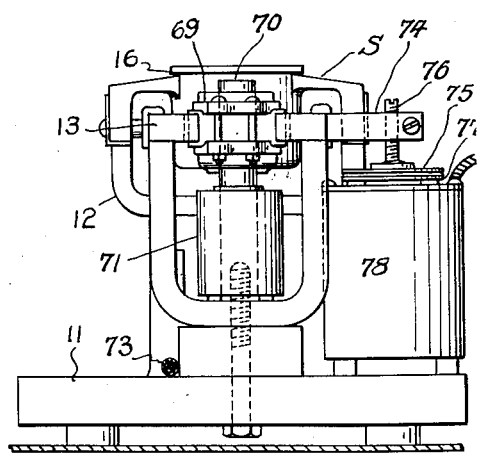
Fig. 4 is a similar view on the line 4—4 of Fig. 1.
Figure 5:
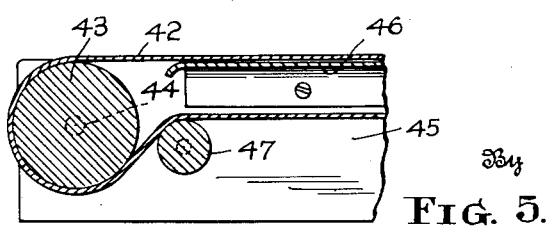
Fig. 5 is a detail vertical sectional view disclosing the conveyor means of the commodity receiver of the weighing mechanism.

Supported by the housing 10 in advance of the commodity-receiving conveyor 42 is the frame 50 of a feeder conveyor 51. This conveyor may be of any suitable length and is adapted to be aligned and operated synchronously with the conveyor 42. The conveyor 51 includes an endless belt 52 which at its ends travels over driving and guide rolls 53 rotatably supported in the frame 50. One of the rolls 53 is driven by a chain 54 which passes around a sprocket 55 carried by the driven shaft of a speed-reducing gearing 56, which, in turn, is driven by an electric motor 57 stationarily mounted within the housing 10. The frame 50 may be adjusted vertically to a limited extent by a slot and screw construction, indicated at 58, whereby to align the advancing run of the belt 52 with that of the belt 42. The discharge end of the feeder conveyor is located immediately adjacent to the receiving end of the scale conveyor 42, so that commodities, indicated at 59, may readily bridge the space between the two conveyors and travel from one to the other without stoppage or tipping. As shown in Fig. 2, the receiving end of the feeder conveyor 51 may be disposed in registration with the outlet of a chute 64 through which the commodities 59 pass successively for delivery to the feeder conveyor. The chute may be of the gravitational type or otherwise.

Arranged in longitudinal alignment with the discharge end of the scale or platter conveyor 42 is a third substantially wider belt conveyor 60. This conveyor has its ends trained around driving and guiding wheels 61, one of which wheels being driven by a suitable chain and sprocket drive and an electric motor 62. The conveyor 60 is mounted in a frame 63 suitably secured to the housing 10. The frame 63 includes spaced upstanding side walls 65 which, at the discharge end of the conveyor 42, are spaced a distance approximately equal to the spacing of the side walls of the frame 45. The side walls extend over the upper run of the conveyor 60 in parallel relation for a suitable distance and then diverge in an outward angular direction, as indicated in Fig. 2, terminating when the same reach the full width of the conveyor 60, which is considerably in excess of that of the conveyor belts 42 and 52.

Positioned adjacent the outer end of the conveyor 60, and extending over the upper run thereof are a pair of solenoid-actuated commodity diverter gates 66 and 67. The gates comprise perpendicularly related horizontal and vertical arms, the horizontal arms extending over the conveyor 60 while the vertical arms are supported for limited rotational movement and extend upwardly from a solenoid housing 68 carried by the housing 10 below the conveyor 60. In this manner, limited rotational movement of the vertical arms will result in limited horizontal swinging movement of the horizontal arms of the diverter gates over the upper run of the conveyor 60. When these gates are in parallel relationship, as shown in full lines in Fig. 2, the commodities, which have passed over the scale conveyor 42, and by the operation of the latter found to be of proper or desired weight, will travel with the belt 60 between said parallel gates along a course or path of travel A. When the gate 66, through the operation of the scale and associated mechanism to be hereinafter defined, assumes the dotted line position illustrated in Fig. 2, the course A will be blocked thereby, and the articles will follow a diverted course indicated at B, which will separate the articles or commodities from those discharged through the course A. Similarly, when the gate 67 is moved to the dotted line position of Fig. 2, the articles of commodities will follow a diverted course C. By this arrangement, correct weight packages are discharged from the apparatus through course A, overweight packages through course B and underweight packages through course C. If desired, a single gate may be employed which will reject over and under weight packages or articles through a single path of discharge when it is not necessary to discriminate between such under and overweight packages or articles.

Carried upon the known weight-receiving side of the scale beam 13, substantially at the outer end thereof is an annular electro-magnetic field winding 69 which is furnished electrical operating current by way of the pair of bow springs 26 carried upon the post 22. Associated with the field winding 69 and received axially thereof is the core 70 of an electro-magnet 71 which is stationarily mounted upon the base 11. Operating current is furnished the field winding of the electro-magnet 71 by lead wires 72 which are connected with a suitable power source, to be hereinafter described. The movable coil or electro-magnetic field winding 69 which is carried by the scale beam 13, in association with the stationary electro-magnet 71, functions to replace the usual dash pot associated with scales of this character for the purpose of damping the normal oscillatory lever movement, whereby to prevent undue hunting of the lever or scale beam due to normal lever movement. The present electro-magnetic damping assembly functions to damp the normal oscillatory movement of the scale lever 13 through the relative polarity of the movable field coils 69 and possesses a positive polarity while the stationary electro-magnet 71 possesses a negative polarity, an attraction force will be set up between the coil and the electro-magnet in opposition to movement of the lever 13 in a general counterclockwise direction, as viewed in Fig. 1. Conversely, if the polarity of the coil 69 and electro-magnet 71 is the same, repulsion forces are established which serve to dampen movement. of the scale beam 13 in a general clockwise direction as viewed in Fig. 1. As will hereinafter be described, the polarity of the movable field coil 69 which is carried upon the scale beam 13 is controlled by an electronic circuit responsive to the movement of the scale beam 13 itself.

Also carried toward the known weight end of the scale beam 13 by means of a laterally extending bracket 74, is a lever controlled condenser 75. The condenser plate 75 is adjustable vertically with respect to its supporting bracket 74 by means of a screw-threaded stud 76 which extends through a cooperatively screw-threaded opening formed in the bracket 74. Positioned in vertical registration with the first condenser plate 75, is a second condenser plate 77 which is carried at the top of a scale oscillator housing 78. The housing 78 contains a vacuum tube oscillator circuit 79 which functions to transmit a signal in accordance with the variation in frequency set up by a relative movement of the condenser plates 75 and 77. From the oscillator circuit 79, the signal is transmitted to a radio frequency amplifier circuit 80 to increase the strength of the oscillator signal from whence the signal is transmitted to a conventional FM detector 81 which converts the oscillator signal current to direct current whose polarity and magnitude are controlled by the spacing between the condenser plates 75 and 77, and therefore by the weight upon the scale beam 13.

In this respect, it is important to note that the detector circuit 81 is so arranged, that when the scale lever or beam 13 is in balance, there is 0 voltage at the output of the detector circuit. The detector circuit 81 is further arranged so as to establish a positive output voltage when the scale indicates an underweight condition, and a negative output voltage upon indication by the scale of an overweight condition.

For purposes of explanation, the output voltage from the detector circuit 81 will hereinafter be referred to as discriminator voltage, due to its function of transmitting either positive or negative voltage in accordance with the spacing of the condenser plates 75 and 77, which spacing is controlled by the various positions of the scale beam 13.

The discriminator voltage transmitted by the detector circuit 81 is used to control the damping of the scale lever 13 by controlling the polarity of the field coil 69 carried thereby. The electro-magnetic damping assembly circuit consists of a beam power amplifier tube 82 which is directly controlled by the discriminator voltage from the detector circuit 81, and whose output is condenser coupled, as at 83, to a parallel load consisting of the portable field coil 69 and a variable resistor 69a which function as an adjustable lever-damping control. The movable field coil 69 is so polarized that current through the movable coil 69 reacts with the magnetic field set up by the electro-magnet 71 so that the resulting force is in opposition to the scale lever movement. The field winding of the electro-magnet 71 is furnished regulated energization current by a suitable power source to be hereinafter more fully described.

The discriminator voltage output of the detector 81 also controls a pair of weight classification tubes 84 and 85, which, in turn, control the operating circuits of the solenoid-actuated diverter gates 66 and 67. Associated with each of the classification tubes 84 and 85 are resistor tolerance controls 86 and 87. The tolerance controls function to set up a bias voltage on the respective classification tubes, making it necessary for the discriminator voltage from the detector 81 to overcome the bias voltage before the discriminator voltage output of the classification tubes is of great enough magnitude (either positive or negative) to affect energization of a pair of relays 88 and 89 which function to control the operating circuit of the respective diverter gates 66 and 67.

Thus, the sensitive relays 88 and 89 are controlled by the classification vacuum tubes 84 and 85 respectively. The control circuits of classification tubes 84 and 85 are so aranged that a voltage of positive polarity is supplied to the control grids of these tubes when the scale lever 13 is in an underweight position. This voltage, the output discriminator voltage of the detector 81, decreases to 0 as the scale lever 13 moves to balance at exact weight, and increases in a negative direction as the lever moves overweight. Therefore, the relays 88 and 89 are energized when the scale lever is in an underweight position. The points at which the relays 88 and 89 are deenergized is controlled by the lever position and the resistor tolerance control adjustment, the latter providing an adjustable bias voltage to classification tubes 84 and 85.

The tolerance controls 86 and 87 associated with the classification tubes 84 and 85 respectively, provide a critical adjustment whereby the consequent operation of the diverter gates may be controlled in accordance with the magnitude of such over or underweight determination. For example, if a commodity passing over the scale conveyor is found to be overweight by one-half ounce, and it is desired that only commodities which are overweight by one ounce be rejected or diverted, the tolerance controls may be adjusted to establish a bias voltage sufficient to cause the classification tubes to continue conducting until the discriminator voltage is of great enough magnitude to overcome the bias voltage and cause relays 88 and 89 to operate.

In operation, classification tube 84 controls the operating point of underweight to correct weight diverter gate 67. When the voltage output of classification tube 84 is of a sufficient magnitude to cause energization of the relay 88, indicating underweight conditions at the scale, a switch 90 is held in an open position. The point at which the relay 88 is deenergized, and the switch 90 is closed, is determined by the position of the scale lever 13 in its movement from an underweight to a balance or overweight condition.

Classification tube 85 controls the operation of relay 89, which, in turn, controls the operation of the circuit associated with the overweight diverter gate 66. Controlled by the relay 89 is a switch 91 which is opened upon energization of the relay 89 and closed upon deenergization thereof.

Arranged in circuit with the switch 90 are a pair of lock-in power relays 92 and 93 which are respectively provided with pairs of switches 92a and 92b, and 93a and 93b. Operation of these latter relays controls the movement of the underweight rejector gate 67, and prevents the same from continuously swinging every time a commodity passes over the scale conveyor 42, and causes a fluctuation of the scale lever 13. Associated with the relays 92 and 93 is a photo-electric cell circuit 94 whose function is to permit classification of the over or underweight characteristics of a commodity passing over the scale conveyor to take place only at the proper instant with respect to the position of the commodity in relation to the scale conveyor 42. As particularly shown in Figs. 1 and 2, the transmitting and receiving units of the photo-electric cell circuit 94, as indicated at 95, are arranged in opposition to one another with the light beam of the transmitting unit extending transversely of the scale conveyor 42 substantially at the outermost end thereof. In this manner, actuation of the diverter gates 66 and 67, and the actual movement thereof to a desired position may be effected only at the instant a commodity intercepts the light beam of the photo-electric cell circuit, immediately prior to the passage of such commodity upon the classification conveyor 60. Actuated in response to the interruption of the light beam of the photo-electric cell circuit 94 is a sensitive relay 96 which operates a bank of switches 97a, 97b and 97c. The switch 97a is connected in series with the relay 92, and controls the operation thereof in association with the relay 88. The photo-electric cell circuit and associated relay 96 further functions to control the operation of a pair of relays 98 and 99 having switches 98a and 99a which are associated with an electromagnetic counter circuit 100 which functions to record the number of under, over, and correct weight commodities passing over the scale conveyor 42. The counter circuit 100 embodies a plurality of solenoids 101 whose energization controls a plurality of mechanical counting devices 102. The switch 97c of relay 96 controls the energization of relay 98.

The photo-electric cell circuit and relay 96 further electrically connected in series, by means of switch 97b, with a pair of series connected power relays 103 and 104 which are interposed within a circuit controlled by the operation of the switch 91 associated with the overweight to correct weight classification tube 85 and relay 89. The photo-electric cell circuit 94 functions in the same manner with relays 103 and 104 as the same does with relays 92 and 93, in that the actual completion of the output circuit through each of these relays is accomplished at the time the photo-electric cell circuit is actuated to energize relay 96. Thus, actual movement within the diverter gates 66 and 67 is accomplished at the time a commodity interrupts the light beam of the photo-electric cell circuit, rather than at the time the commodity initially is introduced upon the scale conveyor 42.

Figure 6:
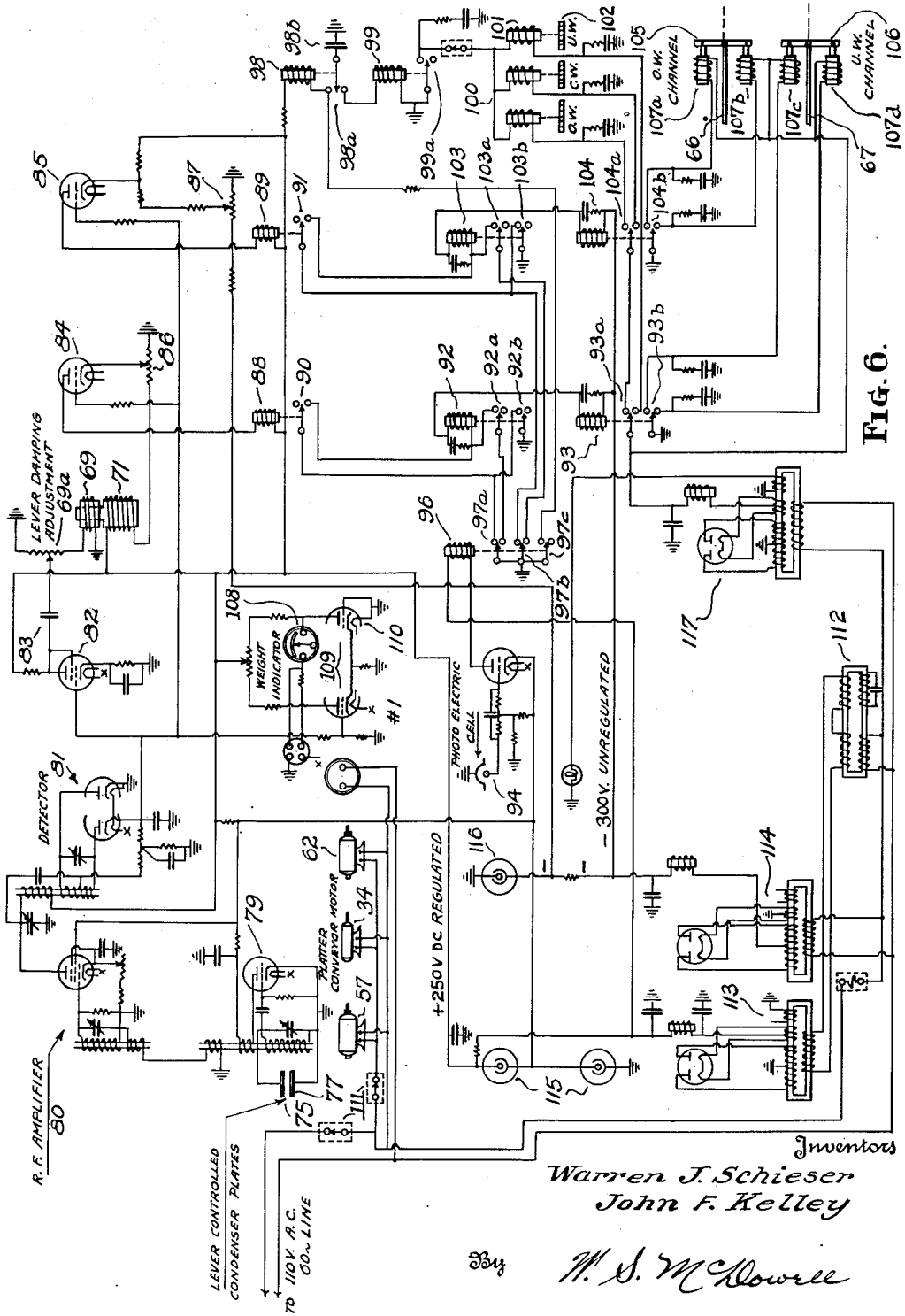
Fig. 6 is a diagrammatic view of the electrical circuits employed in the operation of the apparatus.

As will be seen by Fig. 6 of the drawing, the diverter gates 66 and 67 are coupled at the lower end of their vertical arms with cross levers 105 and 106 which are pivoted at their central portions and connected at either end with the armatures of a plurality of solenoids 107a, 107b, 107c, and 107d whose energization is controlled in accordance with the output voltage of the classification tubes 84 and 85, and the condition of the photo-electric cell circuit 94.

A third function of the discriminator voltage output of the detector circuit 81 is to operate a zero-center-type of vacuum tube volt meter 108 which serves as a visual weight indicator during the passage of commodities over the scale conveyor 42. The circuit associated with the visual weight indicator comprises a twin triode vacuum tube 109 which provides a conventional balance bridge circuit. The control grid on one section of the triode tube is at fixed ground potential, as at 110, that is zero volts, while the control grid on the other triode section is directly controlled by a portion of the discriminator voltage output of the detector circuit 81. Therefore, when the scale lever 13 is in balance, and the voltage of the detector 81 is zero, the control grid voltage on both sections of the triode tube are equal and the bridge circuit is in balance, indicating a correct weight upon the visual weight indicator 108. As the discriminator voltage output of the detector circuit 81 varies from 0, to indicate an out of balance position of the scale lever, the section of the triode tube 109 associated with the discriminator voltage conducts either more or less voltage than the fixed ground potential section of the triode 110, thereby unbalancing the bridge circuit and causing current to flow through the voltmeter to indicate the condition of the commodity as to its overweight or underweight characteristics in accordance with the polarity and magnitude of the discriminator voltage.

As indicated in Fig. 6 of the drawings, the power supply circuit for the entire assembly is the ordinary 110 volts A. C. 60 cycle type which furnishes current through suitable manually controlled switches 111 to the various electric motors associated with the conveyors 52, 42, and 60. The power supply circuit passes by way of one of the switches 111 to a voltage regulating transformer 112 whose output passes to a conventional type full wave rectifier 113. The power supply from the full wave rectifier 113 provides a supply of positive voltage to the plates of all vacuum tubes, and to the field coil of electro-magnet 71. Interposed within the power supply circuit of the rectifier 113 are a pair of voltage regulator tubes 115 which serve to maintain a constant value of direct current voltage regardless of changes in loads and line voltage fluctuations. The voltage regulating transformer 112 further provides for regulation of the alternating current line voltage.

Also connected with the power supply circuit is a second full wave rectifier 114. The power supply of the full wave rectifier 114 provides a source of unregulated negative voltage for energizing the various power relays associated with the diverter gate classification circuits, and makes use of a voltage regulator tube 116 to supply a regulated source of bias voltage to the overweight tolerance control 87 associated with the classification tube 85.

A third conventional type full wave rectifier 117 provides an unregulated source of direct current voltage to operate the solenoids 101 associated with the counter mechanisms, and the solenoids 107a, 107b, 107c and 107d which actuate the diverter gates 66 and 67.

For purposes of explanation, and clarification of the operation of the present weight classification apparatus, the following is an operational description of the various cycles which the present apparatus, and its individual elements, undergo during the course of weighing commodities to determine their weight characteristics:

First, as an underweight package approaches the scale conveyor 42 by way of the conveyor 52, with the scale conveyor 42 empty, the scale lever 13 occupies an underweight position, thereby causing a positive output voltage through the detector circuit 81; the discriminator voltage output of the detector 81 being positive, and of a relatively great magnitude, the classification tubes 84 and 85 will be maintained in a conducting condition whereby the relays 88 and 89 are energized to open the associated switches 90 and 91. Due to the fact that the photo-electric cell beam is uninterrupted, the relay 96 remains deenergized, and the relays 98 and 99 associated with the counter mechanism also are deenergized. The condition of relays 92, 93, 103, and 104 and the switches associated therewith is dependent upon the weight condition of the previous commodity which has passed over the scale conveyor 42, and the same may be either energized or deenergized depending upon the weight characteristics of the previous commodity. As the underweight commodity passes on to the scale conveyor 42, the scale lever 13 moves toward balance to a position corresponding to the underweight characteristics of the commodity, thereby increasing the spacing between the condenser plates 75 and 77 and decreasing the positive discriminator voltage output of the detector 81 slightly, but maintaining the voltage output in a positive condition. In such a condition, classification tubes 84 and 85 will continue to conduct thereby holding sensitive relays 88 and 89 in an energized condition, As the commodity passes in line with the photoelectric cell unit 95, the associated light beam is interrupted, and the photo-electric cell circuit functions to momentarily energize relay 96 which breaks the lock-in circuits to relays 92, 93, 103 and 104, to deenergize such relays if the passage of the previous commodity has left the same in an energized condition.

Energization of relay 96 also causes the energization of relay 98, due to closure of switch 97c, which remains energized during the time the switch 97c is closed. A slight time delay is introduced within the counter circuit by means of a condenser 98b which allows the classification circuit to stabilize before counting takes place. Upon opening of switch 97c, the condenser 98b causes relay 98 to remain energized while the condenser is charging. As relay 98 deenergizes, relay 99 energizes momentarily, due to closure of switch 98a and discharging of condenser 98b, and the counter circuit is completed to indicate passage of one underweight commodity. Due to the deenergized conditions of relays 92, 93, 103, and 104, no circuits are closed by the switches 92a, 92b, 103a, and 103b associated with relays 92 and 103, while the switches 93a, 93b, 104a, and 104b associated with relays 93 and 104 close the circuit to the underweight counter device and provides a ground return circuit for the solenoids 107b and 107d which respectively hold the overweight diverter gate 66 in its full line position as indicated in Fig. 2, and causes the underweight diverter gate 67 to assume its broken line position thereby causing the commodity to pass along the underweight course C on the conveyor 60.

The weighing cycle of a correct weight commodity is as follows: With the commodity approaching the scale conveyor 42, the scale lever 13 occupies an underweight position, thereby causing a positive discriminator voltage output of the detector 81 which, in turn, causes classification tubes 84 and 85 to conduct and hold relays 88 and 89 in an energized position. Relays 98, 96, and 99 remain deenergized. Relays 92, 93, 103, and 104 are in a deenergized position in accordance with the passage of the previous underweight commodity. As the correct weight commodity reaches, and is deposited upon the scale conveyor 42, the scale lever 13 moves to a position corresponding to the weight of the package, which is in balance due to the correct weight of the commodity, thereby causing the discriminator voltage output of the detector circuit 81 to cause classification tube 84 to cut off thereby deenergizing relay 88, while classification tube 85 remains in a conducting condition, due to the regulated input voltage through tolerance control 87 to the bias grid of the tube. Relay 88 is deenergized, while relay 89 remains in an energized condition. As the commodity interrupts the light beam of the photo-electric circuit, relay 96 is energized momentarily breaking the lock-in circuits to relays 92, 93, 103, and 104, but providing ground return circuits for relays 92 and 93 through the switch 90 of relay 88, thereby shifting the control of relays 92 and 93 to the classification relay 88 during the time relay 96 is energized. Relays 92 and 93 are energized through the completion or closure of the circuit of the switch 90 and the closure of the switch 97a. Since the lock-in circuits of relays 92 and 93 are completed, through the closure of the switches 97a and switch 92b of relay 92, an additional lock-in circuit is provided through the switch 92a and 90 to provide a lock-in circuit continuity during the time the armature of relay 96 is moving from the energized to deenergized position.

Relays 98 and 99 function in the same manner as for an underweight commodity, in that the same momentarily energize to energize the solenoids associated with the counter devices 102. The switch 93a associated with relay 93, and the switch 104a associated with relay 104 having moved to a position to supply current to the solenoid associated with the correct weight counter device, thereby permitting energization thereof upon energization of relays 98 and 99 and the recording of the passage of a correct weight commodity. The switches 93b and 104b provide a ground return circuit to solenoids 107b and 107c, thereby energizing the same to move the diverter gates 66 and 67 to a center position parallelism whereby the correct weight commodity may pass through the center of the conveyor 60 along course A.

The following is the weighing cycle of an overweight commodity: As the commodity passes over conveyor 52 and approaches the conveyor 42 of the scale, the scale lever 13 occupies an underweight position with the voltage output of detector circuit 81 being positive to cause conducion within the classification tubes 84 and 85. The relays 88 and 89, due to the conducting condition of the classification tubes 84 and 85, will be energized, and relays 96, 98, and 99 will be deenergized. Relays 92 and 93 are energized, while relays 103 and 104 are deenergized, due to the passage of the previous correct weight commodity over the scale.

As the commodity is deposited upon the scale conveyor 42, the scale beam or lever 13 moves to a position corresponding to the overweight characteristics of the commodity whereupon the discriminator voltage of the detector 81 is of a negative magnitude, and the classification tubes 84 and 85 are cut off to deenergize relays 88 and 89. As the commodity moves across the conveyor 42, the same interrupts the light beam of the photo-electric cell circuit whereupon relay 96 is energized momentarily breaking the lock-in circuits to relays 92, 93, 103 and 104, but at the same time providing ground return circuits for the relays through the switches 90 and 91 associated with the relays 88 and 89 respectively, thereby shifting control of relays 92, 93, 103 and 104 to the classification relays 88 and 89 during the time relay 96 remains energized. Relays 92 and 93 are retained in their energized position during the energization of relay 96, by the closure of switch 90, and the closed condition of switch 97a.

Relays 103 and 104 are energized through the closure of switch 91 and the closure of the switch 97b associated with relay 96. Since the lock-in circuits of relay 103 and 104 are completed through the deenergized position of switch 97b and the closed condition of switch 103b, an additional lock-in circuit is provided through the switch 91 and the closed switch 103a to provide lock-in circuit continuity during the time the armature of relay 96 is moving from the energized to deenergized position. Relays 98 and 99 function in the same manner as for an underweight or correct weight commodity to momentarily energize the counter device solenoids 101. The switches 93a and 104a move to a position to supply current to the solenoid of the overweight counter device 102. The switches 93b and 104b provide a ground return circuit to solenoids 107a and 107c to hold the underweight diverter gate 67 in a straight position and to actuate the diverter gate 66 to its dotted line position in Fig. 2, whereby the overweight commodity will pass over the course B.

As shown throughout the drawings, the individual circuits may advantageously be provided with arc-quench circuits which comprise a condenser and choke coil arrangement. Such arc-quench circuits eliminate arc gaping at the various contact points throughout the circuits.

In view of the foregoing, it will be seen that the present invention provides an improved weight checking and classifying machine which is characterized by its high speed operations and its accuracy in check weighing. Such high speed operation is made possile through the use of the endless belt type conveyor and integrally carried electric motor which are supported solely upon the weight-receiving side of the associated scale mechanism. Through the use of a belt-type conveyor of this nature, which forms an integral part of a continuous conveyor line, the scale conveyor may be operated in synchronization with the remaining belt conveyors arranged on either side of the scale conveyor, and, in so doing, enables commodities to pass in a fast and uninterrupted flow across the scale conveyor to be accurately check weighed during movement along the conveyor line.

Another important feature of the present invention resides in the use of the photo-electric cell circuit for delaying the operation of the commodity diverting gates until a commodity approaches substantially the discharge end of the scale-carried conveyor. Through the use of the photo-electric circuit, and the associated lock-in relays, the diverter gates are prevented from constantly swinging between their diverter positions as fluctuations of the scale lever take place upon the initial introduction of a commodity thereon. As will be understood, such diverter gates would normally return to a position providing an underweight course way upon each weighing cycle were it not for the use of the associated lock-in circuits. The elimination of such constant swinging movement greatly increases the operational life of the present machine, and reduces the noise accompanying the constant swinging movement.

While certain specific elements of the present invention have been described in detail, for purposes of explanation, it will be manifest that various modifications are possible without departing from the spirit of the invention or the scope of the following claims.

We claim:

1. Commodity check-weighing and weight-classifying apparatus comprising a weighing scale having a movable balance member, a commodity-receiving continuous belt conveyor carried solely by said scale and forming a part of a conveyor line over which commodtiies to be weighed move without interruption, motor means carried by said scale for driving said belt conveyor, a second independently mounted power-driven conveyor arranged to receive commodities from said belt conveyor, commodity-diverting means extending over said second conveyor, said commodity-diverting means being movable between positions providing a plurality of separate courseways over and leading from said second conveyor, electro-responsive means for moving said diverting means between such positions, means responsive to the movement of the balance member of said scale and arranged in circuit with said electro-responsive means for determining the operation thereof in accordance with the weight of a commodity passing over said belt conveyor, and photo-electric cell means positioned adjacent said belt conveyor and arranged in circuit with said electro-responsive means for controlling the actuation thereof in response to the passage of a commodity over said belt conveyor.

2. In a commodity check-weighing and classifying apparatus, a weighing scale having a movable balance lever, a commodity-receiving belt type conveyor supported by the balance lever of said scale and forming an intermediate portion of a conveyor line over which commodities to be weighed move without interruption, an electric motor carried by the lever of said scale in association with said conveyor for driving the latter, a second conveyor arranged in longitudinal alignment with said first-named conveyor to receive commodities discharged therefrom, commodity-diverting means extending over said second conveyor and operable to define a plurality of separate courseways over which commodities possessing different weight characteristics may pass to be segregated, electro-responsive means to operate said diverting means, a control circuit for said electro-responsive means, said control circuit comprising a vacuum tube oscillator circuit responsive to the movement of the balance lever of said scale and operable to determine the energization of said electro-responsive means, and a photo-electric cell circuit in series with said oscillator circuit and operable in response to the passage of a commodity over said first-named conveyor to determine the point of operation of said electro-responsive means.

3. In apparatus of the character described, a weighing scale having a balance lever, a receiver for known weights on one end of the balance lever, a commodity-receiving conveyor supported by the opposite end of the lever, motor means supported by the opposite end of the lever for driving said conveyor, said commodity-receiving conveyor being interposed within and forming a part of a conveyor line over which commodities may continuously pass to be weighed without interruption, commodity-segregating means interposed within the conveyor line toward the discharge end of said scale-carried conveyor for separating articles of undesired weight from articles of desired weight, electro-responsive means for controlling the operation of said segregating means, electrical means responsive to the movement of the scale lever for determining the operation of said electro-responsive means, and a photo-electric cell circuit in series with said electrical means for delaying the operation of said electro-responsive means until a commodity passing over said scale supported conveyor reaches substantially the discharge end thereof, thereby establishing a time delay sufficient to permit the scale lever to come to rest prior to the operation of said commodity-segregating means.

4. Apparatus of the character set forth in claim 3, wherein said electrical means comprises an oscillator circuit with a condenser therein operated by the movement of the scale lever to vary the oscillating frequency of said circuit, a detector circuit associated with said oscillator circuit for supplying discriminator voltage in accordance with the position of the scale lever, and a relay circuit controlled by the discriminator voltage output of said detector circuit and connected in series with said electro-responsive means.

5. In check-weighing apparatus, a weighing scale having a balance lever, a receiver for known weights on one end of the balance lever, a continuous belt-type conveyor carried solely by the opposite end of the balance lever, an electric motor carried by said opposite end of the balance lever for driving said conveyor, said conveyor being interposed within and forming an integral part of an extended conveyor line over which commodities may continuously pass to be weighed without interruption, movable commodity-segregating means interposed within the conveyor line toward the discharge end of said conveyor and operable to separate commodities of undesired weight from commodities of desired weight, electro-responsive means to operate said commodity-segregating means, electrical means in circuit with said electro-responsive means and responsive to the movement of the balance lever of said scale to control the operation of said electro-responsive means, a photo-electric cell circuit in series with said electrical means and having a light-responsive member arranged adjacent the discharge end of said conveyor, said photo-electric cell circuit being operable to render said electro-responsive means inoperable prior to the passage of a commodity over substantially the discharge end of said conveyor, and a lock-in relay circuit in circuit with said electrical means and said electro-responsive means to render said electro-responsive means inoperative prior to the introduction of a commodity upon said conveyor.

6. In check-weighing and commodity-segregating apparatus, a weighing scale having a movable balance lever, a continuous belt-type conveyor supported by one end of the balance lever, said conveyor forming a part of an extended conveyor line over which commodities being weighed move without interruption, motor means supported solely by the balance lever and drivingly connected with said conveyor, means in the conveyor line at the discharge side of said belt-type conveyor for segregating commodities of undesired weight from commodities of desired weight, electro-magnetic means to operate said last-named means, electrical means operated by the movement of the balance lever of said scale for determining the operability of said electro-magnetic means, and a photo-electric cell circuit in series with said electrical means to control said electro-magnetic means, said photo-electric cell circuit having a light sensitive member disposed adjacent the discharge side of said belt conveyor and operable in response to the passage of a commodity over the discharge side of the conveyor to close said photo-electric cell circuit.

WARREN J. SCHIESER.
JOHN F. KELLEY.

REFERENCES CITED

The following references are of record in the file of this patent:

UNITED STATES PATENTS

| Number | Name | Date |
|---|---|---|
| 1,584,380 | Krabbendam et al. | May 11, 1926 |
| 1,617,301 | Reddick | Feb. 8, 1927 |
| 1,916,552 | Beach | July 4, 1933 |
| 1,994,550 | Watson | Mar. 19, 1935 |
| 2,067,744 | Williams | Jan. 12, 1937 |
| 2,104,546 | Pennell et al. | Jan. 4, 1938 |
| 2,323,023 | Flanagan | June 29, 1943 |